(12) United States Patent
Coulmeau et al.

(10) Patent No.: US 8,676,481 B2
(45) Date of Patent: Mar. 18, 2014

(54) DEVICE FOR ASSISTING IN THE CHOICE OF A DIVERSION AIRPORT

(75) Inventors: François Coulmeau, Seilh (FR); Christophe Caillaud, Blagnac (FR); Jérôme Sacle, Toulouse (FR)

(73) Assignee: Thales, Neuilly sur Seine (FR)

( * ) Notice: Subject to any disclaimer, the term of this patent is extended or adjusted under 35 U.S.C. 154(b) by 593 days.

(21) Appl. No.: 12/633,994

(22) Filed: Dec. 9, 2009

(65) Prior Publication Data
US 2010/0161156 A1 Jun. 24, 2010

(30) Foreign Application Priority Data

Dec. 23, 2008 (FR) ...................................... 08 07410

(51) Int. Cl.
*G06F 17/30* (2006.01)
*G08G 5/00* (2006.01)
*G05D 1/06* (2006.01)
*G01C 23/00* (2006.01)

(52) U.S. Cl.
CPC ............ *G08G 5/0039* (2013.01); *G05D 1/0676* (2013.01); *G01C 23/005* (2013.01)
USPC .............................. 701/122; 701/16; 701/423

(58) Field of Classification Search
USPC ............... 701/3, 4, 7, 10, 14, 16, 17, 18, 120, 701/532, 122, 423
See application file for complete search history.

(56) References Cited

U.S. PATENT DOCUMENTS 5,057,835 A * 10/1991 Factor et al. .................. 701/532

(Continued)

FOREIGN PATENT DOCUMENTS

EP  0743580 A1  11/1996
FR  2910616 A1  6/2008

OTHER PUBLICATIONS

Sowden, R., "Alternate Airport Selection during Flight Planning to Enhance Fuel Efficiency." Aviation Operational Measures for Fuel and Emissions Reduction Workshop, Ottawa, Canada. Nov. 5-6, 2002. <<www.aerohabitat.org/link14-03-2007%20-%20Transport%20Canada,%20Reducing%20ground%20emissions.pdf>> Last accessed Aug. 22, 2007.

*Primary Examiner* — Helal A Algahaim
*Assistant Examiner* — Dale W Hilgendorf
(74) *Attorney, Agent, or Firm* — Stroock & Stroock & Lavan LLP

(57) ABSTRACT

The invention relates to a device for assisting in the choice of a diversion airport for an aircraft piloted by a crew (200), said aircraft comprising a flight management system including location means (207) calculating the position of the aircraft, said device comprising a navigation database (202) and a performance database (203) of the aircraft, said device being characterized in that it comprises a company database (201) comprising airports and characteristics of said airports, means (205) of calculating a list of airports, called candidate airports, from the airports in the company database, from the navigation database and from the selected characteristics by the crew, means (204) for calculating remaining flight time and fuel consumption predictions for each of the candidate airports from the position of the aircraft, from weather conditions and from the performance database, and an interface giving the favored airports for diversion according to pre-established criteria or determined in real time using the interface.

8 Claims, 9 Drawing Sheets

(56) References Cited

U.S. PATENT DOCUMENTS

| | | | |
|---|---|---|---|
| 5,398,186 A * | 3/1995 | Nakhla | 701/16 |
| 5,526,265 A * | 6/1996 | Nakhla | 701/16 |
| 5,842,142 A * | 11/1998 | Murray et al. | 701/16 |
| 7,167,782 B2 * | 1/2007 | Humbard et al. | 701/3 |
| 8,032,267 B1 * | 10/2011 | Simon | 701/4 |
| 2007/0129855 A1 | 6/2007 | Coulmeau | |
| 2008/0177432 A1 | 7/2008 | Deker et al. | |
| 2008/0294304 A1 | 11/2008 | Coulmeau | |

* cited by examiner

DEVICE FOR ASSISTING IN THE CHOICE OF A DIVERSION AIRPORT

CROSS REFERENCE TO RELATED APPLICATIONS

The present application claims priority to French Patent Application Serial No. 0807410, filed Dec. 23, 2008, which is hereby incorporated by reference in its entirety.

TECHNICAL FIELD

The invention relates to assistance in navigating an aircraft and in particular choosing a diversion airport.

BACKGROUND OF THE INVENTION

The diversion of an aircraft to an airport that is different from the initial destination occurs for example in the event of failure or in the event of particularly bad weather conditions. The use of databases containing all the airports makes it difficult to choose a diversion airport, because the number of airports displayed on a navigation screen can be considerable, notably when the aircraft is flying over a continental area.

The crew must therefore take time to choose the best diversion airport in case of need. Various criteria are involved in the choice of an airport, aircraft criteria (runways, radio beacons, weather, etc.) but also criteria relating to the passengers or to the management of airplane failures (possible maintenance, delay in routing parts, availability of hangers, hotel network, medical and police resources, charges, opening/closure times of the airport or of the air terminal etc.). The crew can contact its company, which will propose the airport to which the airplane may be diverted according to its perception of the problem, which can take time if the aircraft is flying over an area where communications are of poor quality between the flight deck and the ground. Private aviation does not offer the assistance of a ground crew for the pilots in the same way as airlines do (also called air operators). Hereinafter in this document, the term "air company" or "company" will be used to mean an organization operating an aircraft.

When the time factor becomes predominant for being diverted, the crew can choose, by agreement with air traffic control, an airport that may then prove problematic, for example: no possibility of taking off again and no hotel for the passengers. A typical example of this situation is as follows: a failure has occurred on an engine of a 777 type aircraft in flight AF267 from Seoul to Paris. The aircraft has had to make an emergency landing at Irkoutz in Siberia. The two hundred passengers and the crew members waited there for another aircraft of the same type to come and fetch them from Paris. They finally arrived in Paris but will have taken close to forty hours to make the journey from Seoul to Paris. In some cases, the crew does not necessarily have the time to contact in advance its company's flight tracking service, or else could not do so because of a failure on board the aircraft. The flight tracking service (also called dispatch) is a service on the ground responsible for assisting a crew in taking decisions concerning in-flight operations.

On board flight management systems (FMS) are known that are computers determining the geometry of the 4-dimensional profile (3 dimensions and time-speed profile) and proposing to the pilot or sending to the automatic pilot guidance instructions for following this profile. FIG. 1 represents a flight management system according to the known art that has the following functions described in the ARINC 702A standard (Advanced Flight Management Computer System). They normally handle all or some of the functions of:

navigation LOCNAV 170 for optimally locating the aircraft according to satellite geolocation means (for example GPS or GALILEO), terrestrial geolocation means (for example: VOR, DME or NDB) or onboard geolocation means (for example: inertial units or onboard computers called "air data computers");

flight plan FPLN 110 for inputting geographic elements forming the outline of the route to be followed (departure and arrival airports, diversion airports, departure and arrival procedures, waypoints, airways);

navigation database NAV_DB 130 for constructing geographic routes and procedures from data included in the databases (points, beacons, interceptor or altitude legs, etc.) and for choosing the terrestrial beacons for the LOCNAV function. This database also includes objects created by the crew, in particular the airports and runways (called pilot database);

performance database PRF_DB 150 containing the aerodynamic and engine parameters of the aircraft;

lateral trajectory TRAJ 120 for constructing a continuous trajectory from the points of the flight plan, observing airplane performance characteristics, passenger comfort and containment constraints (called RNP);

predictions PRED 140 for constructing an optimized profile on the lateral trajectory (altitude, time, fuel and speed profile) and taking into account weather parameters (wind, temperature, atmospheric pressure);

guidance GUID 190 for servocontrolling the aircraft in the lateral and vertical planes on its trajectory in 3 dimensions, while observing the setpoint speeds and reducing the engine effects and for sending guidance instructions to an automatic pilot 193;

digital data link DATALINK 180 for communicating with the air traffic control centres (ATC function) 191 and the other aircraft, and with the company (AOC function) 191 in order to communicate the updates to the parameters relating to the alternative airports.

These different functions are accessible to the pilot via an interface 194.

The functions that can be accessed via an FMS are insufficient to allow a relevant choice of a diversion airport. On the one hand, the content of the navigation databases of the flight management system is standardized internationally (Arinc 424). These navigation databases do not contain company data other than regular routes (company routes), this information being insufficient for a quick decision concerning a diversion airport. On the other hand, these databases are static and are updated only every twenty-eight days whereas certain airport characteristics require more frequent updates.

Also known from U.S. Pat. No. 5,526,265 is a system presenting a list of airports closest to the position of the aircraft, these airports being derived from the navigation database of the flight management system by calculating a set of information for each of them (distance, estimated time of arrival, fuel consumption). This airport selection may have little relevance when the aircraft is crossing a region with a high density of airports.

SUMMARY OF THE INVENTION

The aim of the invention is to overcome these drawbacks. More specifically, it relates to a device for assisting in the choice of a diversion airport for an aircraft piloted by a crew, said aircraft comprising a flight management system including location means calculating the position of the aircraft, said device comprising a navigation database and a performance database of the aircraft, said device being characterized in that it comprises:

a company database comprising airports and characteristics of said airports, means of calculating a list of airports, called candidate airports, from the airports in the company database, from the navigation database and from the selected airport characteristics.

means for calculating remaining flight time and fuel consumption predictions for each of the candidate airports from the position of the aircraft, from weather conditions and from the performance database, means of interaction with the crew for selecting characteristics to be observed by each of the candidate airports and for displaying said candidate airports.

According to a characteristic of the invention, the device comprises display means on a navigation screen representing: the aircraft, airports identified by different colours, a first colour identifying the airports that meet all the selected characteristics, a second colour identifying the airports that do not have all the selected characteristics and a third colour identifying the airports that are unsuitable for a diversion.

According to a characteristic of the invention, the device comprises a display representing a list of airports and, for each of the airports: the direction of the airport, the distance between the aircraft and the airport, the characteristics of the airport and the associated predictions for reaching it.

According to a characteristic of the invention, the display representing a list of airports comprises, for each airport, a series of symbols associated with characteristics, a symbol being coloured according to a colour code indicating a degree of conformity of the airport with regard to a characteristic, a first colour indicating full conformity, a second colour indicating partial conformity and a third colour indicating non-conformity.

According to a variant of the invention, the characteristics used by the means of calculating a list of airports are determined by the crew of the aircraft.

According to another variant of the invention, the assistance device also comprises means of selecting the characteristics used by the means of calculating (205) a list of airports situated on the ground and enabling a company operating the aircraft to determine said characteristics. These selection means on the ground are used when it is the company operating the aircraft that determines the characteristics of the candidate airports.

According to a characteristic of the invention, the device comprises means for calculating and displaying a prediction of the integrity of the satellite navigation means for each of the candidate airports.

According to a variant of the invention, the company database, the means of calculating a list of airports, the means for calculating predictions and the means of interaction with the crew are implemented in the flight management system of the aircraft.

According to another variant of the invention, the company database, the means of calculating a list of airports and the means of interaction with the crew are implemented in a computer connected to the flight management system, the means for calculating predictions being implemented in the flight management system of the aircraft.

According to another variant of the invention, the company database, the means of calculating a list of airports, the means for calculating predictions and the means of interaction with the crew are implemented in an independent application of the flight management system, said application being executed on at least one computer of the aircraft.

The invention makes it possible to differentiate, among the airports contained in the world navigation databases, those that are of more particular interest to a given company, according to criteria specific to that air operator. It also provides the crew with a means of rapidly filtering the interesting airports according to these criteria.

The transfer of operating data from the ground to the flight deck by using a customarized database renders the crew independent in choosing the alternate aerodrome. Thus, the invention is useful for: assisting a crew in taking a decision to divert in case of difficulty contacting the flight tracking service (loss of communication for example), obtaining from it diversion information in time or assisting in dialogue with the flight tracking service, by presenting complete information on the possible diversion airports proposed by this service.

BRIEF DESCRIPTION OF THE DRAWINGS

The invention will be better understood and other benefits will become apparent from reading the detailed description, given by way of nonlimiting example, and using the figures in which.

DETAILED DESCRIPTION OF THE INVENTION

Figure 2:
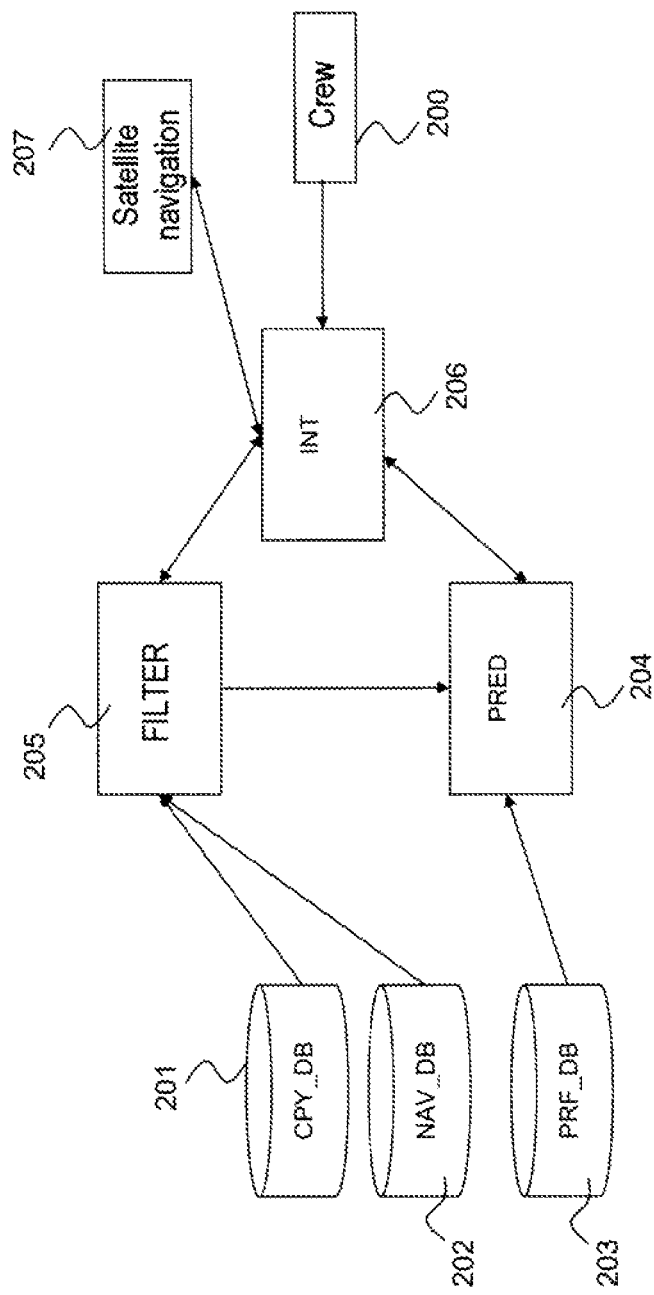
FIG. 2 represents a diagram illustrating the main modules of the device according to the invention.

The device according to the invention is on board an aircraft. FIG. 2 represents a diagram illustrating the main modules of the device according to the invention. This device comprises a first database, called company database 201. Such a database lists, for each airport that can be used as a diversion airport for the company, a certain number of criteria or of characteristics such as, for example:

the presence of local air traffic control (ATC) in service (timetables) or an AFIS service (flight information service and the alert service are handled for the benefit of aerodrome traffic), access restrictions requiring authorization or qualification for the pilots, particular precautions associated with the airport and with the airplane performance characteristics (airport briefing sheet and key points of the following types: runway width, taxiway accessibility, strength to withstand airplane weight), the availability and category of the fire safety equipment of the fire and emergency service (SSIS), the presence of technical assistance (repair shop, spare parts store), fuel replenishment (timetables, type of fuel available), representation of the company or commercial partners (details, VHF, telephone contacts), hosting capabilities (in terms of quantity, distance from the aerodrome), medical assistance (specialities, distance from the aerodrome).

In order to be reliable according to the up-to-date conditions, the company database 201 needs to be able to be loaded into the system hosting it whenever there is a sufficient change to the airport data relating to the planned route and conforming to the characteristics of the airplane being operated (mass, dimensions, performance, etc.). This database 201 is more flexible than the navigation database of the flight management system: the company database can be updated more frequently than the navigation database 202 of the flight management system. In the case of general aviation (or private aviation), the criteria of the company database are adapted to this particular operating scenario.

The device according to the invention comprises a second database, called navigation database 202. This database is in the Arinc 424 format and comprises for each airport: an identification of the runways, the landing length and the type of instrument let-down and associated radio navigation means.

The device according to the invention comprises a third database, called performance database 203. This database contains performance models of the aircraft and it may be identical to that used by the FMS.

The device according to the invention also comprises:

filtering means 205 for calculating a list of airports, called candidate airports, from the airports in the company database, the navigation database and from selected criteria, an onboard computer 204 for calculating predictions regarding the time and fuel consumption needed to reach an airport, such as, for example, the FMS, or another onboard computer. These computers can be used to calculate, for each airport of the company network, predictions on the estimated time to reach it, and the fuel consumed or even the weight of the aircraft on landing;

means 206 of interaction with the crew for selecting criteria to be observed for each of the candidate airports and for displaying said candidate airports. These interaction means 206 present the preferred airports for diversion, according to pre-established criteria or criteria determined in real time using the interface.

The function of means 206 of interaction with the crew is to present to the crew the overall list of company airports with their characteristics (on interactive FMS pages, from company CPY_DB and navigation NAV_DB databases), and to show on the mid-head displays (called ND for navigation display) the airports selected by the filtering means 205. The interaction means 206 can similarly be interfaced with the company via an appropriate data link (AOC for example) in order to be updated with relevant information. The interaction means 206 can be used to interrogate satellite navigation means, such as a GNSS receiver, with the position and the arrival estimate of each airport in order to know the integrity predictions of the GPS constellation. This function of the GNSS receiver is known by the name PREDICTIVE RAIM, and can be used to ascertain the availability of the RAIM (receiver autonomous integrity monitoring) if the airplane had to reach this airport at this time. This function determines whether the satellite coverage will be sufficient to obtain a reliable position for the aircraft. This prediction is made over a time interval, for example 15 minutes before or after the planned time of arrival. The integrity prediction is calculated for each of the candidate airports. The interaction means 206 comprise, on the one hand, displays making it possible to situate the airplane and the company airports with their characteristics and, on the other hand, input means making it possible to select a certain number of company criteria (for example, only the airports with company personnel on the ground, etc.) to filter the display on the displays. These onboard input means are used when it is the crew that determines the characteristics of the candidate airports.

The aircraft can have a capability to obtain weather forecasts by data link. This then has the effect of refining the calculation of the different predictions and therefore improving their accuracy.

According to a characteristic of the invention, the device comprises an airport selection means situated upstream of the filtering means 205 described hereinabove. This selection means determines airports in the company database that can be accessed from the current position of the airport with the quantity of fuel on board. The quantity of fuel used to make this selection does not take account of a regulatory reserve of 30 minutes. Also used to determine whether an airport can be reached by the aircraft are weather data including the known wind on the route, if this information is available, or the wind at the current position otherwise. This second hypothesis is all the more plausible when the airport is close to the aircraft. This selection means serves as a first filter and can be used to improve the response times of the following calculations by limiting the number of airports.

Figure 3:
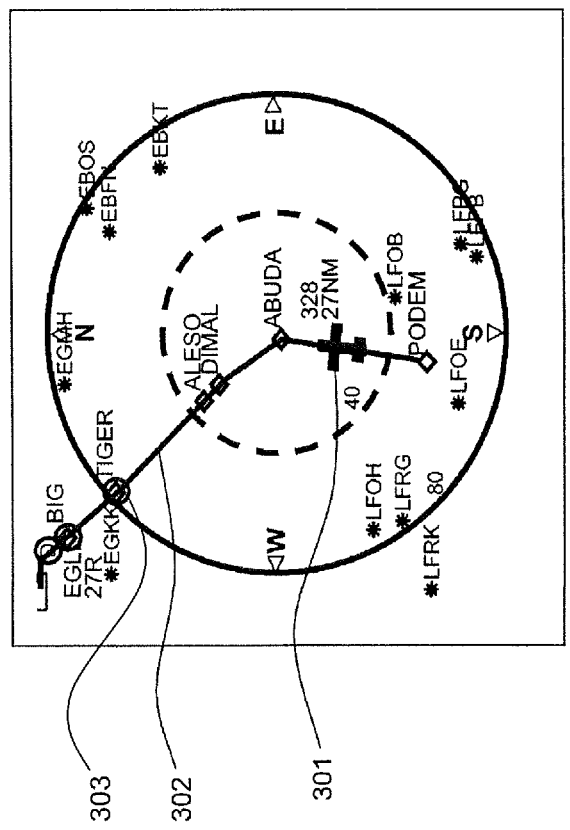
FIG. 3 represents a first exemplary display means according to the invention.

FIG. 3 represents a first example of display means according to the invention. This display means provides a display intended for a navigation screen type device. This display represents: an aircraft 301, a flight plan followed by the aircraft 302, airports identified by different colours. A first colour, for example green, identifies the airports 303 that observe all the selected characteristics, for example TIGER, EBKT, ALESO, DIMAL. A second colour, for example yellow, identifies the airports that do not have all the characteristics selected by the crew, for example LFOB, LFPG, LEPB and a third colour, for example amber, identifies the airports that are not suited to a diversion, for example LFOH, LFRG. The airports represented correspond to the sort presented on a CLOSEST AIRPORTS page presenting the airports closest to the aircraft. These airports are displayed with the colour codes described hereinabove or with labels associated with the airports. The display also proposes the closest company airport and the diversion airports (take off, en route and arrival) programmed in the flight plan with a particular identification.

The criteria not observed by an airport can be accessed rapidly by the crew, for example by selecting the airport concerned using a pointing device for interactive navigation screens.

There are two display variants for the colours of the airports. A first variant displays colours corresponding to criteria selected by the company. A second variant displays colours corresponding to the criteria selected by the pilot.

The company can configure the criteria governing the yellow and amber colours for an airport. This configuration is modifiable. A configuration menu is associated with the company database either for each airport or for each group of criteria. For example, a colour can be associated directly with an airport: the airport LFBO is green, the airport LFBL is yellow. A colour can also be associated with criteria: the airports that fulfil the criteria A, B, C and D are green, the airports that fulfil the criteria A, B and C or A, B and D are yellow and the other airports are amber.

The crew is responsible for determining the manual creation of the diversion flight plan, in particular the choice of rejoining point, its verification and its activation and the use of a function of the FMS (for example of DIR-TO type, defining a direct trajectory to a given point) to rejoin the selected point.

Figures 4, 5:
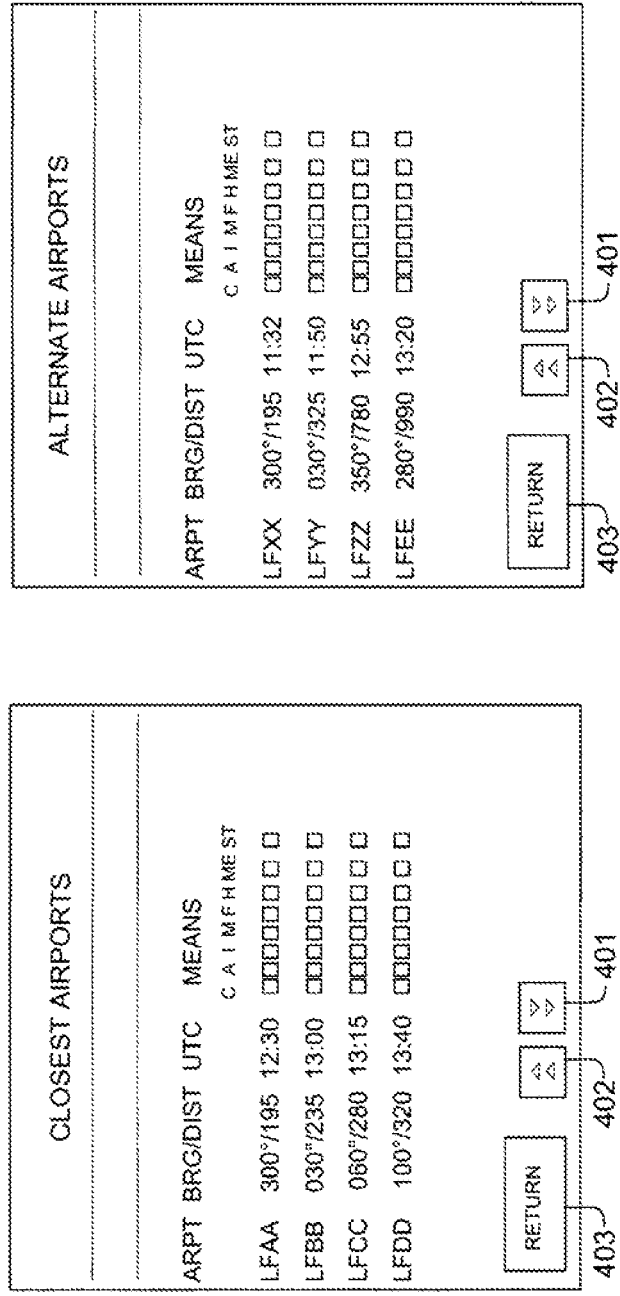
FIG. 4 represents a second exemplary display means according to the invention.
FIG. 5 represents a third exemplary display means according to the invention.

FIG. 4 represents a second example of means of displaying a list of airports according to the invention. The display of a list of airports according to the invention comprises elements known in the prior art. This display is presented in the form of a table, with each line corresponding to a given airport. Each column corresponds to an item of information concerning an airport: a first column ARPT presents airports according to a code standardized by the International Civil Aviation Organisation (ICAO), for example LFAA. A second column BRG/DIST (for "bearing" and distance) indicates the position of the airport and its distance with the current position of the aircraft, for example a 195 Nm (nautical miles) for the airport LFAA. A third column UTC gives the planned time of arrival at the airport. This display, known by the designation "closest airport", indicates the airports closest to the current position of the aircraft. The display according to the invention differs from a known "closest airport" display in that it also comprises a fourth column MEANS indicating characteristics of the airport. These characteristics are identified by abbreviations that can be easily memorized by the crew. The characteristics are, for example: C for air traffic control; A for approach means, I for airport infrastructure possibly including fire fighting means (SSIS), M for maintenance, F for fuel, H for hotels, ME for medical assistance and ST for station (support for stopover).

A coloured square indicates a degree of conformity for each characteristic described hereinabove. A colour code is associated with a degree of satisfaction of the criteria, for example three colours, green, yellow and amber respectively indicating three levels of conformity: conforming fully, conforming partially and nonconforming.

A first 401 and a second 402 keys make it possible to scroll these characteristics on the page. A third key 403 can be used to simplify navigation between the pages of the FMS and in particular return to the page having provided access to the CLOSEST AIRPORTS page.

FIG. 5 represents a third example of means of displaying a list of airports according to the invention. A page, called ALTERNATES, listing the diversion airports defined before the mission also includes a fourth column MEANS indicating characteristics of the airport. The general presentation of this display is identical to that of FIG. 4.

Figure 6:
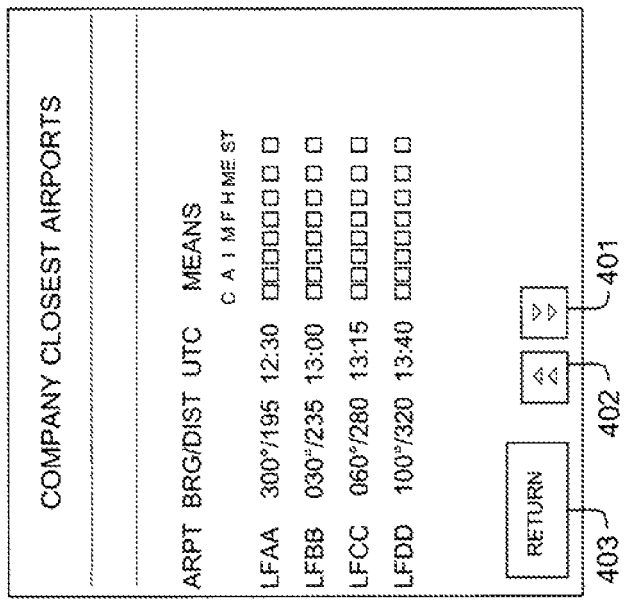
FIG. 6 represents a fourth exemplary display means according to the invention.

FIG. 6 represents a fourth example of means of displaying a list of airports according to the invention. This display, called "closest airport company", is in a format identical to the display of FIG. 4. This display differs from that presented in the preceding figure in that it presents airports that are closest and that satisfy the criteria defined by the crew. They correspond to the airports displayed with the first colour on the navigation display presented in FIG. 3. A variant display consists in displaying the detail of the means (MEANS) on another display, the criteria retained and their colour code.

Figure 7:
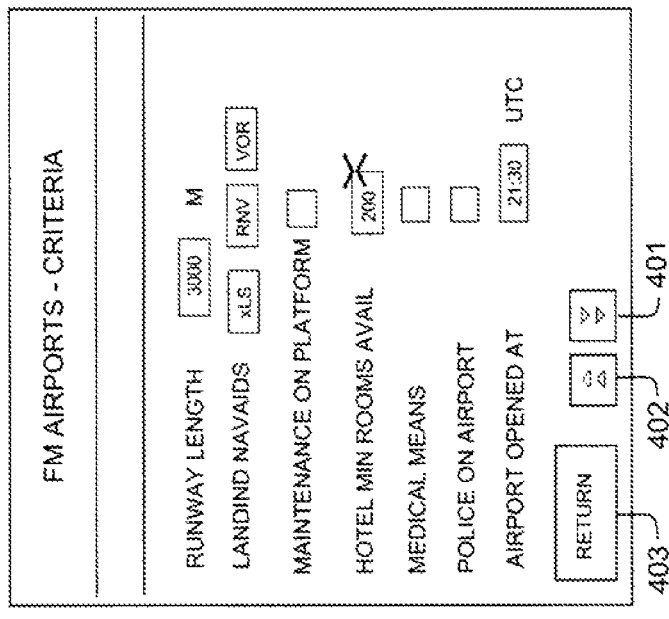
FIG. 7 presents an example of criteria input means according to the invention.

FIG. 7 presents an example of criteria input means according to the invention. The selection of the criteria can be made when preparing for the flight or in flight. For interactive FMSs the preselections are made through lists. The page consists of several lines, each line comprising the title of the characteristic and a space for selecting a value associated with this characteristic. In this example, it is the length of the runway (3000 meters), navigation aid equipment (xls beacon, RNV and VOR), maintenance (not entered in this example), hosting capabilities (200 rooms), the presence of medical infrastructure, the presence of police and airport opening times.

Figure 8:
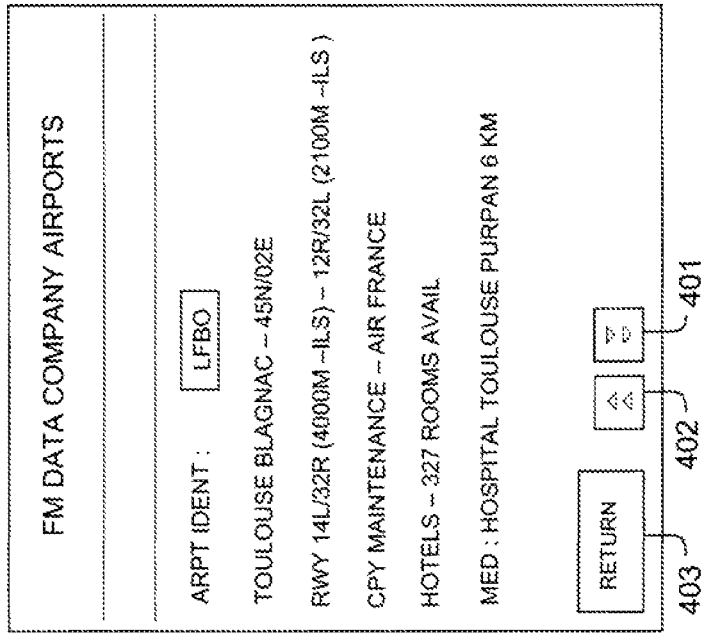
FIG. 8 presents an example of means of displaying detailed characteristics of an airport.

FIG. 8 presents an example of means of displaying detailed characteristics of an airport. The display is available in the form of a display called "DATA COMPANY AIRPORT" showing the detail of the characteristics of the airport presented. In this example, it is the identifier of the airport (LFBO), the name of the airport (Toulouse Blagnac) and its coordinates (45N/02E), runway designations, the name of the company handling maintenance, available host capacities (327 rooms) and medical infrastructures (a hospital 6 km away).

Figure 1:
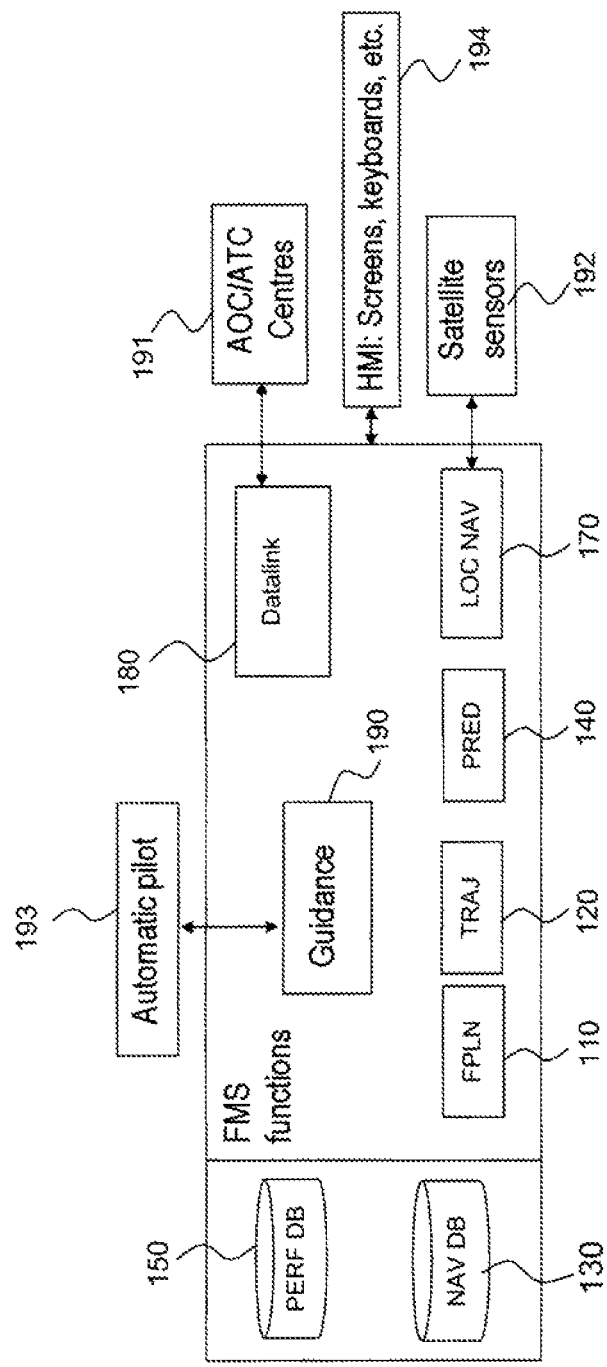
FIG. 1, already presented, represents a flight management system according to the known art.
Figure 9:
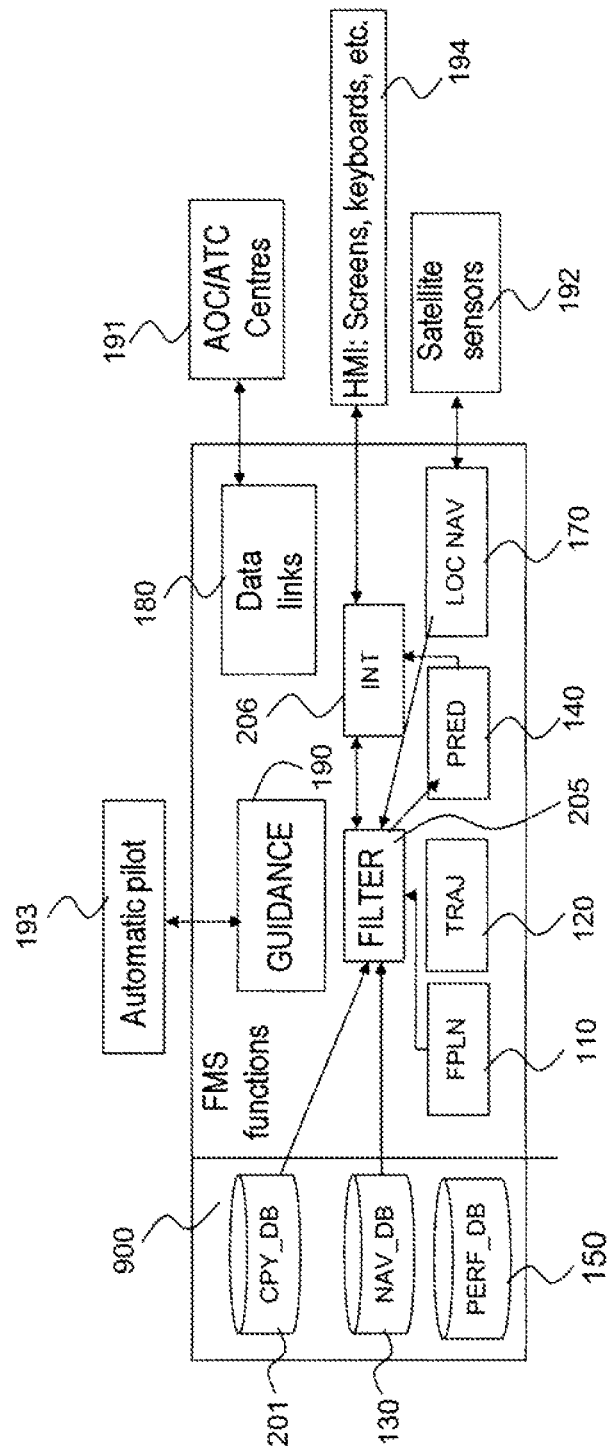
FIG. 9 presents a first exemplary implementation of the device according to the invention.

FIG. 9 presents a first exemplary implementation of the device according to the invention. This implementation is produced at the level of a flight management system FMS 900 according to the known art as described in FIG. 1. The company database 201, the means for filtering 205 and the means for interaction 206 are integrated in the FMS 900. The prediction means are implemented by the prediction function of the FMS 900. This implementation is noteworthy in that the company data used can be directly accessed in the FMS computer 900. The restricted number and the stability of the company airports makes it possible to store the data in a computer that is usually dedicated to navigation. This implementation has the advantage of guaranteeing the uniqueness of the data. It is possible to physically "merge" the company database CPY_DB and the navigation database NAV_DB, or make a link from the company airports of the navigation database NAV_DB to the navigation database CPY_DB.

Figure 10:
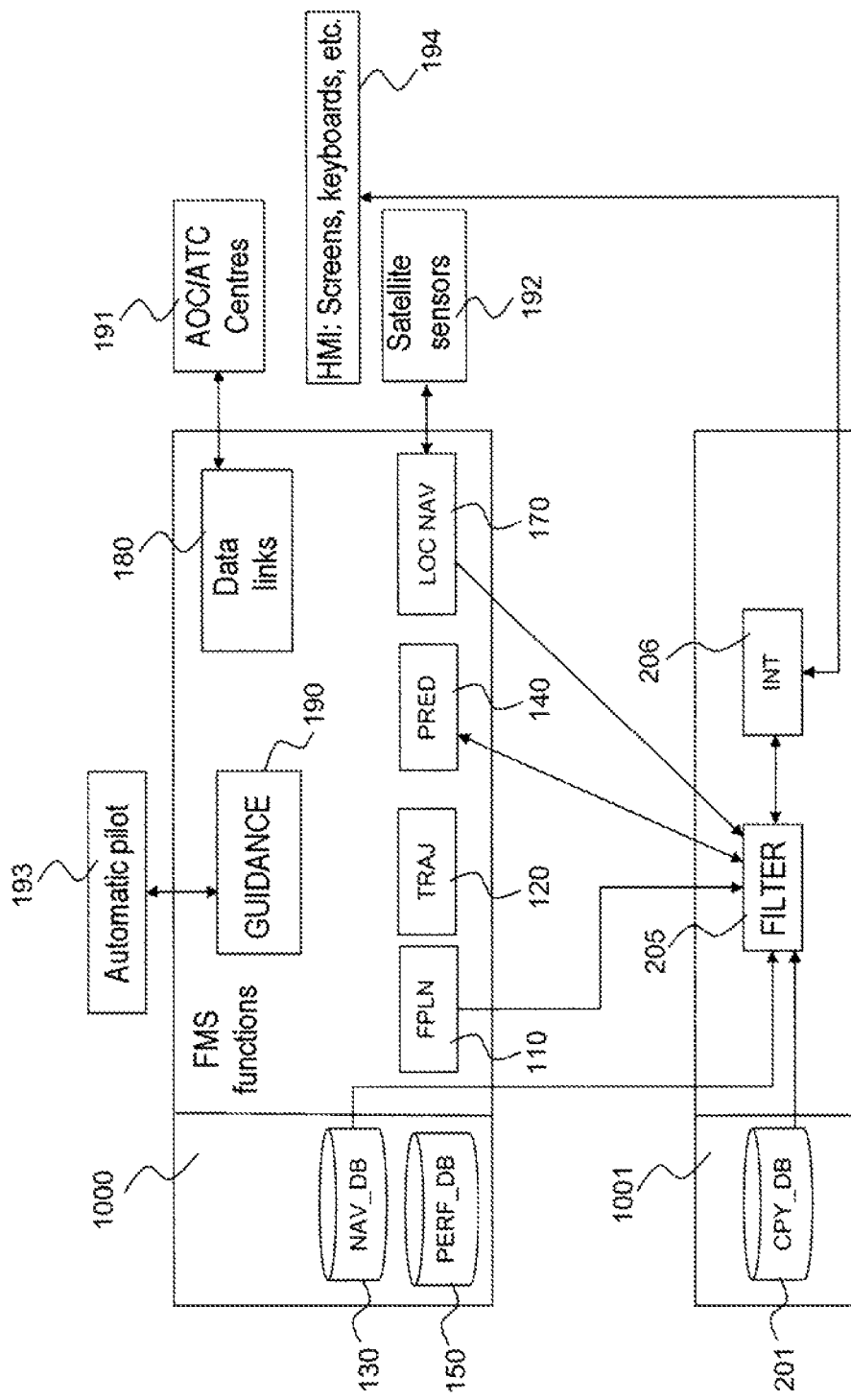
FIG. 10 presents a second exemplary implementation of the device according to the invention.

FIG. 10 presents a second exemplary implementation of the device according to the invention. This implementation is made at the level of a flight management system FMS according to the known art as described in FIG. 1 and on another computer. This "open world" type computer 1001 has a level of criticality less than that of the FMS. This computer 1001 can be an Electronic Flight Bag, abbreviated EFB, which typically includes the following functions:

pilot checklist, electronic cockpit documentation (FCOM, MEL, specific airline documentation, operational procedures, etc.), performance calculation tools, airplane mass and centring management, mission administrative management, navigation maps and airport maps, weather and aeronautical data, information on reliefs and obstacles, information on traffic (ADS-B/TIS-B info) (CDTI) (possible merging of TCAS/ADS-B), NOTAMs (for notice to airmen) message to flight personnel relating to map modifications, work on a runway, temporary obstacles, or an update of the maps with warnings, video surveillance (landing gear release, states of the surfaces of the airplane), fuel management.

The FMS 1000 is a data server for the computer that hosts the filtering means. The benefit of this architecture is that it places the company database in an "open world" computer, whose level of criticality is less than that of the FMS. The means for interaction are linked to the same interfaces as those used by the FMS or to dedicated interfaces.

The means for filtering require the airplane position to be received in order to select the company airports around the airplane. This position is supplied by the location module of the FMS 1000. The means for calculating predictions are implemented by the PRED function of the FMS 1000 because it is strongly coupled to the performance database of the FMS 1000. This is a hybrid configuration.

Figure 11:
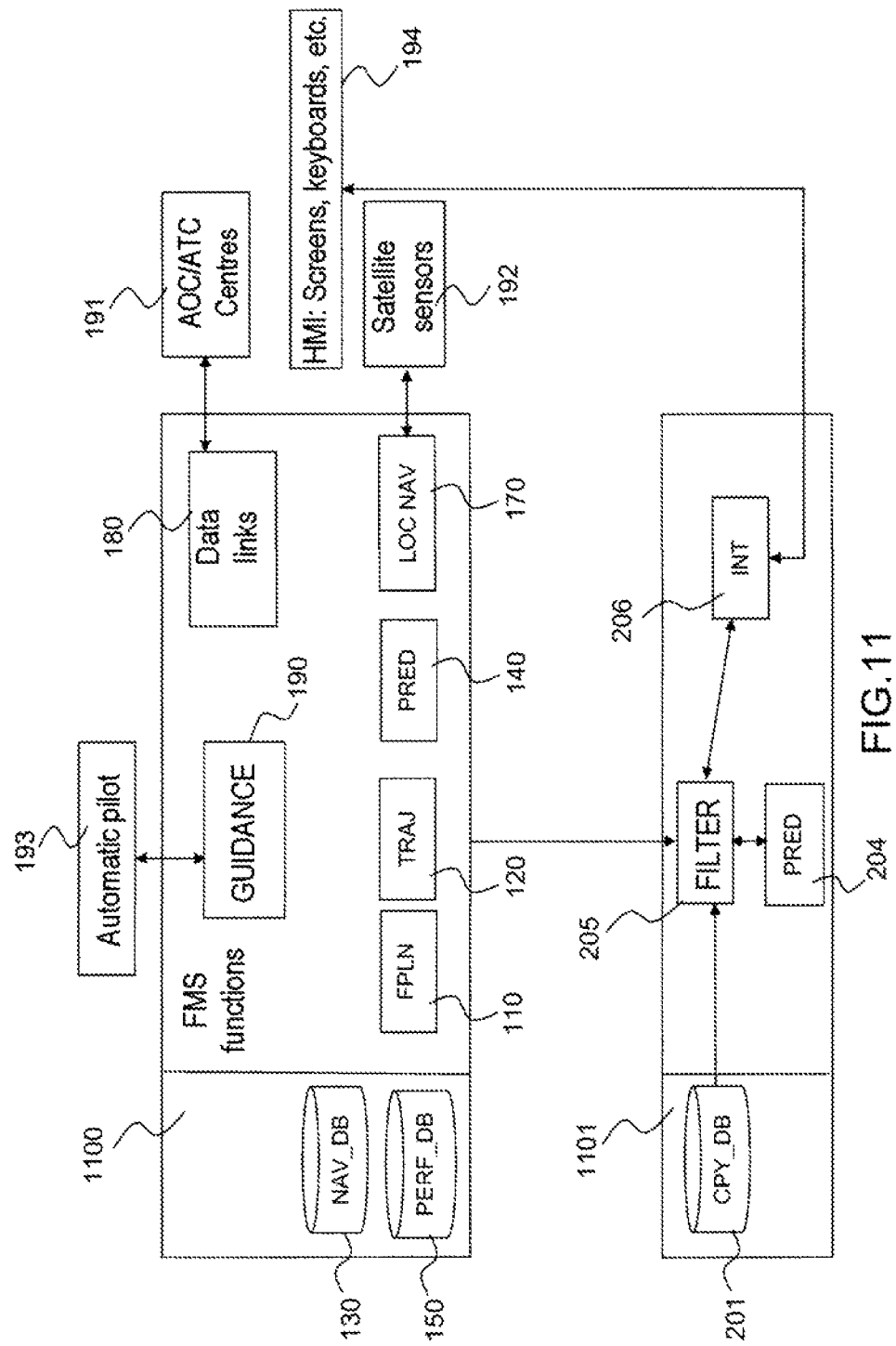
FIG. 11 presents a third exemplary implementation of the device according to the invention.

FIG. 11 presents a third exemplary implementation of the device according to the invention. This implementation is made in an independent application 1101. This application comprises the company database, the means for filtering, the means for predictions and the means for interaction. This application 1101 can be run on one or more computers of the aircraft in parallel. This application collaborates with the FMS 1100 notably to recover the airplane position used by the prediction means and the means for filtering. As in the preceding implementation, the means for interaction are linked to the same interfaces as those used by the FMS 1100 or to dedicated interfaces.

The invention claimed is:

1. A device for assisting in a choice of a diversion airport for an aircraft piloted by a crew, said aircraft comprising a flight management system including location means calculating the position of the aircraft, said device comprising a navigation database and a performance database of the aircraft, said device further comprising:
   an onboard computer for calculating remaining flight time and fuel consumption predictions for each for accessible airports from the position of the aircraft, from weather conditions and from the performance database and from the navigation database,
   a company database onboard the aircraft comprising information relating to characteristics of airport services including at least one airport service selected from the group consisting of technical assistance, hosting capacities, medical assistance, and presence of police,
   a first filter configured to utilize the onboard computer to determine airports in the company database that can be reached by the aircraft from a current position of the aircraft with a quantity of fuel onboard the aircraft,
   a second filter for calculating a list of candidate airports from airports determined by the first filter according to selected criteria relating to said airport services, the selected criteria corresponding to availability of said services or specific values of characteristics of said services, entered by the crew, and of particular interest to said company, and
   an interface for interacting with the crew for:
      obtaining the selected criteria relating to airport services from the crew, displaying the list of candidate airports calculated by the second filter, and for each candidate airport, displaying related characteristics and a symbol associated with a degree of conformity of said related characteristic with the selected criteria.

2. The device according to claim 1, wherein the interface comprises display means on a navigation screen representing: the aircraft, airports identified by different colors, a first color identifying airports that meet all the selected criteria related to airport characteristics, a second color identifying airports that do not have all the selected criteria related to airport characteristics and a third color identifying airports that are unsuitable for a diversion.

3. The device according to claim 1, wherein the interface comprises a display representing the list of candidate airports and, for each of the airports in the list: a direction to the airport, a distance between the aircraft and the respective airport, the respective characteristics of the airport and associated predictions for reaching the airport.

4. The device according to claim 3, wherein the display representing the list of candidate airports comprises, for each airport, a series of symbols associated with characteristics, a symbol being colored according to a color code indicating a degree of conformity of the airport with regard to the selected criteria, a first color indicating full conformity, a second color indicating partial conformity and a third color indicating nonconformity.

5. The device according to claim 1, wherein the company database, the second filter, the onboard computer and the interface for interacting with the crew are implemented in the flight management system of the aircraft.

6. The device according to claim 1 wherein the company database, the second filter and the interface for interacting with the crew are implemented in a computer connected to the flight management system, and the onboard computer is implemented in the flight management system of the aircraft.

7. The device according to claim 1 wherein the company database, the second filter, the onboard computer and the interface for interacting with the crew are implemented in an independent application of the flight management system, said application being executed on at least one computer of the aircraft.

8. The device according to claim 1, wherein the company database is capable of being more frequently updated than the navigation database.

* * * * *